United States Patent
Koumura

(10) Patent No.: US 7,419,174 B2
(45) Date of Patent: Sep. 2, 2008

(54) STRUT TYPE SUSPENSION

(75) Inventor: Shingo Koumura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 266 days.

(21) Appl. No.: 11/075,270

(22) Filed: Mar. 9, 2005

(65) Prior Publication Data

US 2005/0218622 A1    Oct. 6, 2005

(30) Foreign Application Priority Data

Apr. 1, 2004    (JP) .............................. 2004-109201

(51) Int. Cl.
*B60G 15/00*    (2006.01)

(52) U.S. Cl. .................. 280/124.147; 280/124.146; 280/124.155

(58) Field of Classification Search .......... 280/124.147, 280/124.155, 124.146, 124.154
See application file for complete search history.

(56) References Cited

U.S. PATENT DOCUMENTS

| 3,573,880 | A | * | 4/1971 | Sakai ................... 280/124.146 |
| 5,454,585 | A | * | 10/1995 | Dronen et al. ......... 280/124.145 |
| 5,467,971 | A | * | 11/1995 | Hurtubise et al. ........... 267/220 |
| 5,941,351 | A | * | 8/1999 | Etnyre .................. 188/322.17 |
| 5,947,459 | A | | 9/1999 | Ducloux et al. |
| 6,082,720 | A | | 7/2000 | Ducloux et al. |
| 6,382,648 | B1 | * | 5/2002 | Handke ................ 280/124.151 |
| 6,398,201 | B1 | * | 6/2002 | Solomond et al. ........... 267/220 |

| 6,923,461 | B2 | 8/2005 | Momose et al. |
| 2003/0006574 | A1 | 1/2003 | Momose et al. |

FOREIGN PATENT DOCUMENTS

| CN | 1157226 A | 8/1997 |
| DE | 26 45 060 A1 | 4/1978 |
| DE | 41 02 742 A1 | 8/1991 |
| DE | 696 27 116 T2 | 12/2003 |
| DE | 601 09 094 T2 | 4/2006 |
| EP | 0 265 059 A1 | 4/1988 |
| EP | 0 301 517 A2 | 2/1989 |
| JP | A 9-300932 | 11/1997 |
| JP | A 11-48728 | 2/1999 |
| JP | A 2002-283820 | 10/2002 |
| WO | WO 02/40299 A1 | 5/2002 |

OTHER PUBLICATIONS

Chinese Office Action.

* cited by examiner

*Primary Examiner*—Eric Culbreth
(74) *Attorney, Agent, or Firm*—Oliff & Berridge, PLC

(57) ABSTRACT

A strut type suspension with a reduced difference between left and right suspensions in a moment-arm length change during stroke operations of left and right suspensions in phase is disclosed. The suspension includes a strut, an upper spring seat, a lower spring seat, and a coil spring. A coil center axis of the coil spring and a kingpin axis are set to be in a twisted relationship. In a plan view seen from an upper side along an axis of the strut, a lower axis center of the coil spring is located in a front side of the vehicle with respect to the axis of the strut, and, in said view, a line connecting an upper axis center of the coil spring and the axis of the strut extends in a rotating angle around the axis of the strut between 40 degrees and 50 degrees with respect to a line connecting the lower axis center of the coil spring and the axis of the strut.

5 Claims, 4 Drawing Sheets

STRUT TYPE SUSPENSION

TECHNICAL FIELD

The present invention relates to a strut type suspension that has the coil center axis of a coil spring and a kingpin axis in a twisted relationship.

BACKGROUND ART

In the state of art, such a strut type suspension is proposed in JP11-48728 A, in which the coil center axis (axis line) of a coil spring is set in a twisted relationship with respect to a kingpin axis so as to generate moment around the kingpin axis in a toe-in direction, in order to improve responsiveness, stability, and straight line in stability of a vehicle.

By the way, in such a strut type suspension as mentioned above, depending on ways to set the twisted relationship between the coil center axis and the kingpin axis, the twisted relationship of the coil center axis with respect to the kingpin axis may change when the upper spring seat of the coil spring rotates at the up-and-down stroke operation of the suspension, resulting in change in moment-arm length. At this time, if winding directions of the coil springs for left and right wheels are set to be the same, a difference in moment-arm length between the suspension on the left side and the suspension on the right side occurs during stroke operations of the left and right suspensions in phase, which causes the generation of a steering moment for both of the left and right wheels in the same direction (e.g. in a right-side steering direction), leading to a problem of vehicle pull.

DISCLOSURE OF INVENTION

It is an object of the present invention to provide a strut type suspension in which a change in moment-arm length that causes the problem of vehicle pull is substantially prevented or the difference in moment-arm length between the suspension on the left side and the suspension on the right side during stroke operations of the left and right suspensions in phase is reduced.

In order to achieve the above-mentioned objects, according to one aspect of the present invention a strut type suspension is provided that includes a strut that has an upper end mounted on a vehicle body and a lower end mounted on a suspension arm, an upper spring seat rotatably mounted on the strut, a lower spring seat fixed to the strut, and a coil spring that is provided between the upper spring seat and the lower spring seat while surrounding the strut, wherein a coil center axis of the coil spring and a kingpin axis are in a twisted relationship, characterized in that a rotating center axis of the upper spring seat is aligned with the center axis of the coil spring.

According to this aspect of the invention, it is possible to substantially eliminate a change in moment-arm length during up-and-down stroke operations of the suspension.

According to another aspect of the present invention a strut type suspension is provided that includes a strut that has an upper end mounted on a vehicle body and a lower end mounted on a suspension arm, an upper spring seat rotatably mounted on the strut, a lower spring seat fixed to the strut, and a coil spring that is provided between the upper spring seat and the lower spring seat while surrounding the strut, wherein a coil center axis of the coil spring and a kingpin axis are in a twisted relationship, characterized in that, in a plan view seen from an upper side along the axis of the strut, a lower axis center of the coil spring is located in the front side of the vehicle with respect to the axis of the strut, and, in said view, a line connecting an upper axis center of the coil spring and the axis of the strut extends in an outboard direction of the vehicle with a rotating angle between 40 degrees and 50 degrees around the axis of the strut with respect to a line connecting the lower axis center of the coil spring and the axis of the strut.

According to this aspect of the invention, it is possible to reduce the difference in moment-arm length between the suspension on the left side and the suspension on the right side during stroke operations of the left and right suspensions in phase.

In the aforementioned aspects of the invention, it is possible to configure the left and right suspensions to be laterally symmetric for use in a left wheel and a right wheel, respectively, of the vehicle, wherein the winding direction of the coil spring for the left wheel is the same as the winding direction of the coil spring for the right wheel. It is also possible to set the twisted relationship between the coil center axis of the coil spring and the kingpin axis so as to generate moment around the kingpin axis in a toe-in direction. An arrangement is also possible in which, in a plan view seen from an upper side along an axis of the strut, a line connecting a lower axis center of the coil spring and the axis of the strut substantially corresponds to the fore-and-aft direction of the vehicle.

Other objects, features and advantages of the present invention will become more apparent from the following detailed description when read in conjunction with the accompanying drawings.

BEST MODE FOR CARRYING OUT THE INVENTION

Hereafter, the preferred embodiments according to the present invention are explained with reference to the drawings. The present invention may be applied to a MacPherson strut type suspension (such type of suspension consists of a shock absorber as a part of a suspension link, and a transverse link).

Figure 1A:
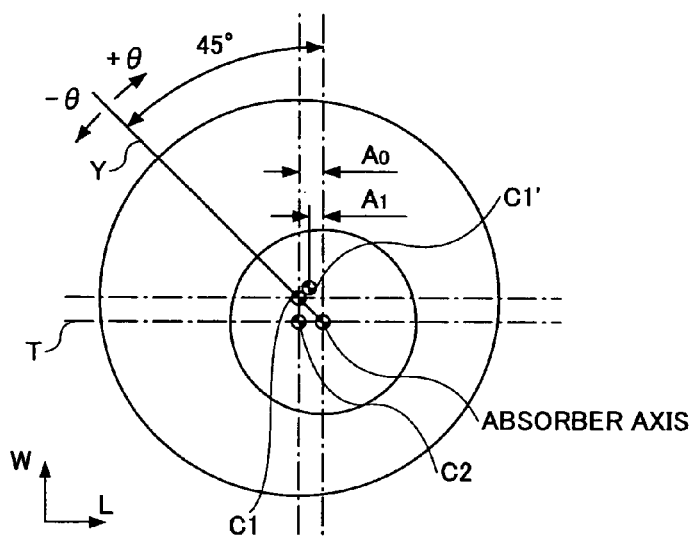
FIGS. 1A-1C are three mutually perpendicular views of a strut type suspension according to a first embodiment of the present invention.
Figure 1B:
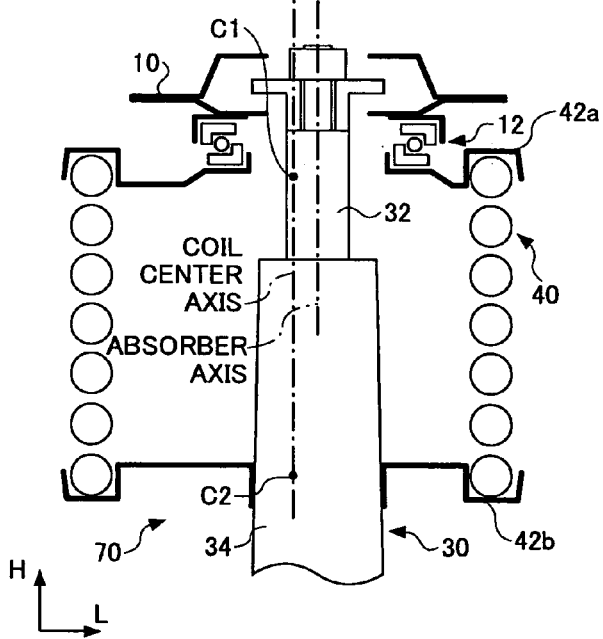
Figure 1C:
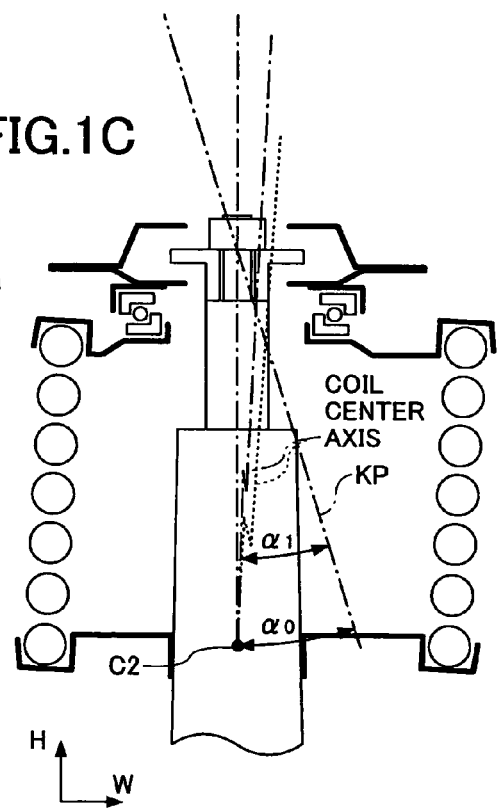

FIGS. 1A-1C are three mutually perpendicular views of a strut type suspension according to a first embodiment of the present invention. Specifically, FIG. 1A is a schematic plan view of the strut type suspension seen from above along the axis of a strut, FIG. 1B is a schematic side view of the strut type suspension seen from the inboard side of a vehicle, and FIG. 1C is a schematic rear view of the strut type suspension seen from the back side of the vehicle.

Referring mainly to FIGS. 1A-1C, at a suspension tower in an engine compartment are provided an upper support 10 which supports the upper end of a strut assembly 70, which suspends a wheel, with respect to a vehicle body. To the upper support 10 is attached the upper end of a piston rod 32 of a shock absorber 30 via a rubber part or the like. To the lower end of a piston cylinder 34 of the shock absorber 30 is connected the wheel via a suspension arm, a knuckle or the like.

To the lower side of the upper support 10 is rotatably supported an upper spring seat 42*a* via a bearing, and to the piston cylinder 34 of the shock absorber 30 is fixed a lower spring seat 42b. Between the upper and lower spring seats 42a, 42b is provided a coil spring 40 such that the coil spring 40 surrounds the shock absorber 30. The coil spring 40 may be any type of coil spring as long as it has a linear coil center line. For example, the coil spring 40 may be a type of a coil spring that has the same radius on the upper and lower sides, a big tail type that has different radii between the upper and lower sides, a barrel shaped type that has the biggest radius at about the midpoint position or the like. The shock absorber 30 serves to carry a vertical load as a part of a link system, as well as to prevent spring resilience of the coil spring 40 during up-and-down movements of the wheel (during bound and rebound movements).

It is noted that the strut assembly 70 may have ordinal components, which may not be illustrated in the drawing for the purpose of clarity. For example, the strut assembly 70 may have a dust cover at the perimeter of the shock absorber 30, and a bound stopper for limiting the up movement of the piston cylinder 34 of the shock absorber 30 may be provided on the piston rod 32 of the shock absorber 30.

Next, features of the first embodiment are described. An absorber axis of the shock absorber 30 (an axis of the strut) corresponds to a rotating axis of the upper spring seat 42a (a rotating center of the bearing 12 that does not correspond to the coil center line). It is noted that, with the arrangement in which the absorber axis of the shock absorber 30 corresponds to the rotating center of the bearing 12, it is easy to reserve a required clearance between the bearing 12 and the piston rod 32 of the shock absorber 30. It is also noted that the absorber axis (=the rotating axis of the bearing 12) is substantially aligned with a kingpin axis in the side view (see FIG. 1B), as is the ordinal case. The kingpin axis inclines such that its upper part falls to the inboard side of the vehicle in the rear view (see FIG. 1C), as is the ordinal case.

The coil center axis of the coil spring 40, in the side view (see FIG. 1B), is set in the front side of the vehicle with respect to the absorber axis and substantially parallel to the absorber axis. The coil center axis inclines such that its upper part falls to the outboard side of the vehicle in the rear view (see FIG. 1C). Thus, in the view seen from above along the axis of the strut (see FIG. 1A), an upper axis center C1 of the coil center axis (an axis center of the coil spring 40 at the upper spring seat 42a) is located in the front and outboard side of the vehicle with respect to the absorber axis and a lower axis center C2 of the coil center axis (an axis center of the coil spring 40 at the lower spring seat 42b) is located in the front side of the vehicle with respect to the absorber axis and substantially in the same location as the absorber axis in a lateral direction of the vehicle.

In this embodiment, in the view seen from above along the axis of the strut (see FIG. 1A), the upper axis center C1 has an offset of about 45 degrees in a rotating angle around the absorber axis with respect to the lower axis center C2 (i.e., a line Y connecting the upper axis center C1 and the absorber axis forms an angle of 45 degrees with a line T connecting the lower axis center C2 of the coil spring and the absorber axis). In other words, assuming that the direction indicated by L in the FIG. 1A corresponds to the rear direction of the vehicle and the direction indicated by W in the FIG. 1A corresponds to an outboard direction of the vehicle, the upper axis center C1 is located in the front and outboard direction of the vehicle at an angle of 45 degrees with respect to the absorber axis, and the lower axis center C2 is located in the front direction of the vehicle with respect to the absorber axis. However, it is noted that in practice the absorber axis rarely corresponds to a vertical direction completely, so the direction L doesn't completely correspond to the rear direction of the vehicle and the direction W doesn't completely correspond to the lateral direction of the vehicle.

The strut assembly 70 of this embodiment as shown in FIGS. 1A-1C is constructed to be laterally symmetric for use with a left wheel and a right wheel of the vehicle. However, the coil spring 40 may be the same for use in both of the left and right wheels (i.e., the coil spring 40 may have the same winding directions for use in both of the left and right wheels) in order to implement cost reduction due to its shared use.

With the strut type suspension according to this embodiment, since the kingpin axis KP and the coil center axis form a twisted relationship as mentioned above, moment is generated around the kingpin axis KP in a toe-in direction. Thus, responsiveness, stability, and straight line in stability of a vehicle during a steering operation are improved. However, since the coil center axis doesn't correspond to the rotating axis of the upper spring seat 42a in this embodiment, moment-arm length for the moment generated around the kingpin axis KP will change when the upper spring seat 42a rotates with the contraction of the coil spring 40 as a result of a suspension stroke during a bound operation. Here, the moment-arm length is given by (moment-arm length)=A×sin α≈A×α, where A is an offset distance between the kingpin axis KP and the coil center axis (the distance between both axes in the twisted relationship), and α is an angle between the kingpin axis KP and the coil center axis. It is noted that the moment M generated around the kingpin axis KP is given by M=F×A×α, where F is a reaction force of the coil spring 40.

Figure 2A:
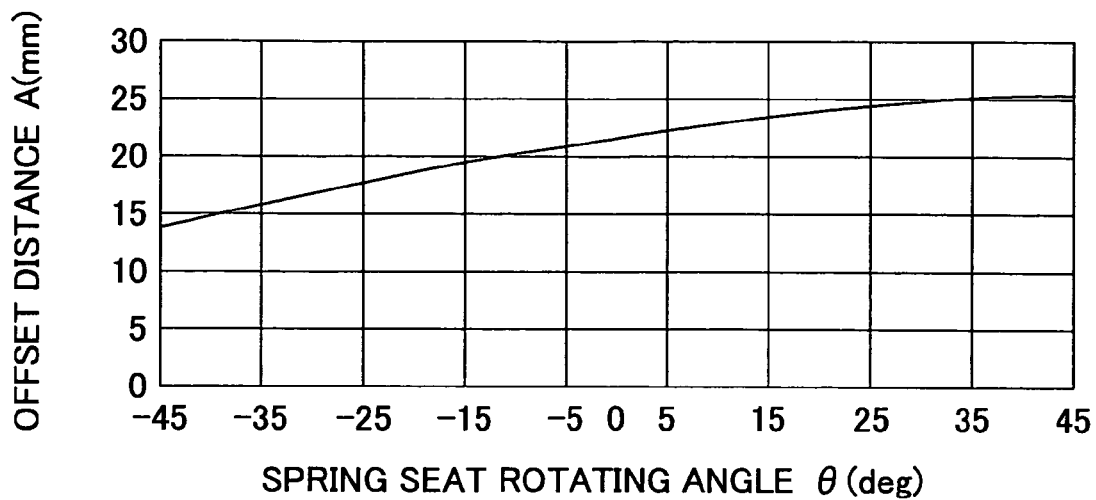
FIGS. 2A-2D are graphs for illustrating characteristics of the strut type suspension according to the first embodiment.
Figure 2B:
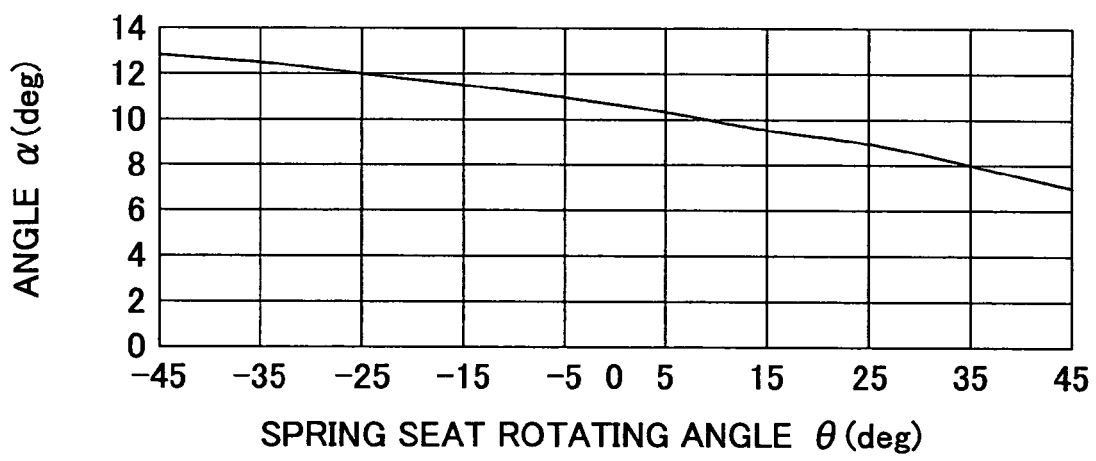
Figure 2C:
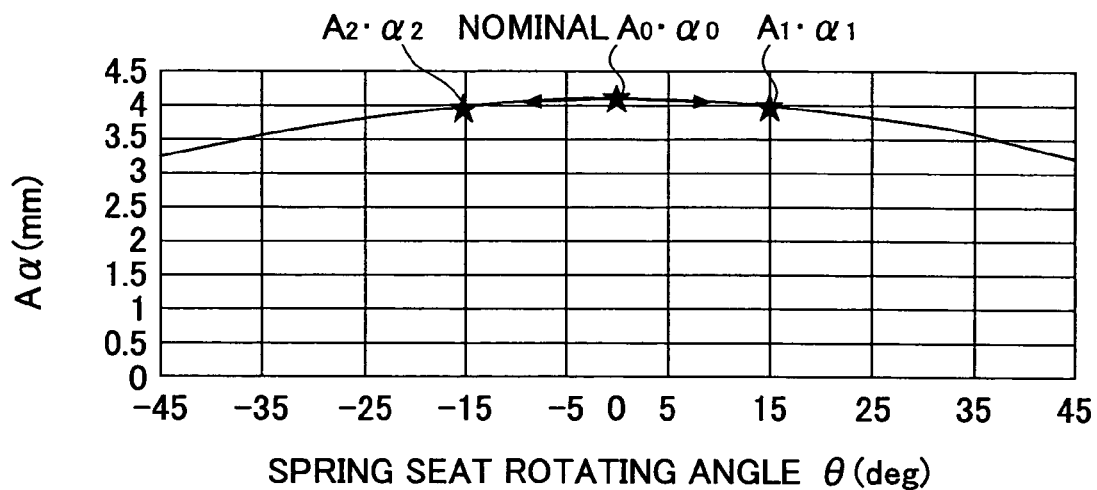

FIG. 2A is a graph illustrating variations in an offset distance A versus a rotating angle θ, FIG. 2B is a graph illustrating variations in an angle α versus a rotating angle θ, and FIG. 2C is a graph illustrating variations in moment-arm length A·α versus a rotating angle θ.

Here, a rotating angle θ of the upper spring seat 42a is defined in a clockwise direction, using the rotating angle of the upper spring seat 42a in a nominal payload state (e.g. a state in which occupants with predetermined weight are seated in a driver seat and a passenger seat) as a reference angle 0 (a nominal angle). In this embodiment, as shown in FIG. 2C, the nominal angle of the upper spring seat 42a (θ=0) is associated with a point where a rate of change in moment-arm length A·α becomes 0 (i.e., an extremum). Thus, according to this embodiment, since the rate of change in moment-arm length A·α as a function of a rotating angle θ is small around the nominal angle, the change in moment-arm length A·α due to the suspension stroke can be reduced effectively.

Further, in this embodiment, as shown in FIG. 2C, a curve representative of a change in moment-arm length A·α is symmetric about the nominal angle of the upper spring seat 42a between a plus area and a minus area of a rotating angle θ. If the coil springs 40 with the same winding direction are adopted for the strut type suspensions of the left and right wheels, rotating angles θ of the upper spring seats 42a on the left wheel and the right wheel vary in reverse between plus and minus during stroke operations of the left and right suspensions in phase (e.g. in the case of the right hand coil, the rotating angle θ on the right wheel varies in a plus direction while the rotating angle θ on the left wheel varies in a minus direction). In this embodiment, since the changing characteristic of the moment-arm length A·α is substantially symmetric about the nominal angle of the upper spring seat 42a between the plus direction and the minus direction as mentioned above, the difference in moment-arm length A·α between the left side and the right side during stroke operations of the left and right suspensions in phase is reduced.

For example, in the case where a right hand coil is adopted for the left and right wheels, when the upper spring seat 42a on the right wheel rotates plus 15 degrees during stroke operations of the left and right suspensions in phase, as shown in FIG. 1A, the location of the upper axis center C1 changes to the location C1', and thus the offset distance changes from A0 to A1, the angle α changes from α0 to α1, as shown in FIGS. 1A, 1C, FIGS. 2A and 2B, and the moment-arm length A0·α0 changes to A1·α1 as shown in FIG. 2C. At the same time, the upper spring seat 42a on the left wheel rotates minus 15 degrees, and similarly the moment-arm length A0·α0 changes to A2·α2 as shown in FIG. 2C. Since these two moment-arm lengths A1·α1 and A2·α2 are the same, there is no difference in moment generated around the kingpin KP between the left and right suspensions. In this way, according to this embodiment, even if the moment-arm length A·α changes during the stroke operations of the left and right suspensions in phase, there is no difference in moment generated around the kingpin KP between the left and right suspensions, which prevents vehicle pull during the stroke operations of the left and right suspensions in phase.

On the other hand, in a comparative arrangement in which the upper axis center C1 has a offset of 70 degrees (45 degrees plus 25 degrees) in a rotating angle around the absorber axis with respect to the lower axis center C2, the nominal angle of the upper spring seat 42a corresponds to the rotating angle θ=−25 shown in FIG. 2C. Thus, as shown in FIG. 2D, since the rate of change in moment-arm length A·α at the nominal angle θ=−25 is relatively large, the change in moment-arm length A·α due to the suspension stroke can be relatively large accordingly.

Figure 2D:
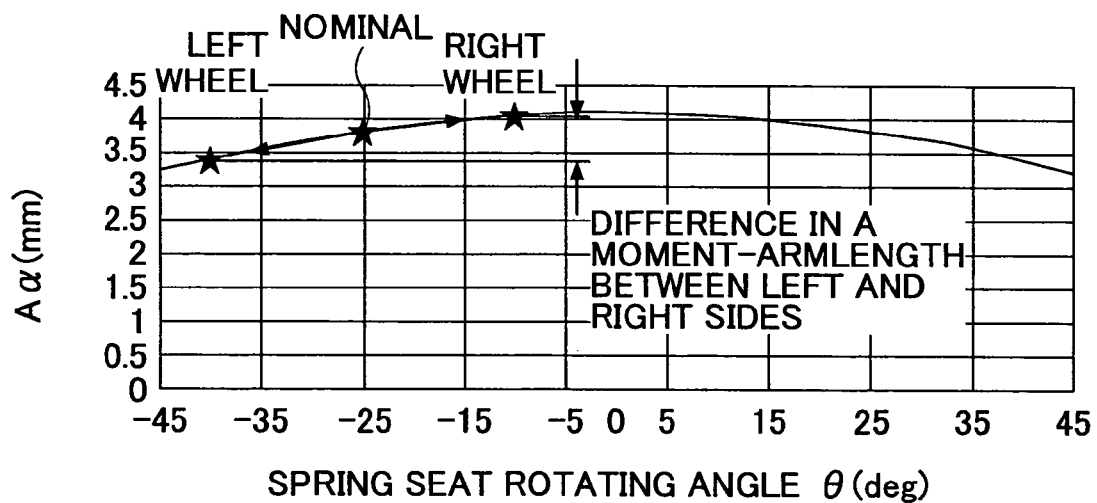

Similarly, in the case of this comparative arrangement, when the upper spring seat 42a on the right wheel rotates plus 15 degrees and the upper spring seat 42a on the left wheel rotates minus 15 degrees, as shown in FIG. 2D, a relatively large difference in a moment-arm length between the left and right sides is generated, and thus a relatively large difference in moment generated around the kingpin KP between the left and right suspensions is generated, leading to a problem of vehicle pull.

It is noted that the arrangement in which the nominal angle of the upper spring seat 42a is located at the rotating angle θ=0 shown in FIG. 2C is described as a preferred embodiment; however it is apparent that it is possible to effectively reduce the difference in a moment-arm length between the left and right sides with respect to the comparative arrangement if the nominal angle of the upper spring seat 42a falls in a angle range between θ=−10 and θ=10, thus the present invention should not be interpreted such that it excludes such an arrangement which has the nominal angle in such an angle range.

Figure 3A:
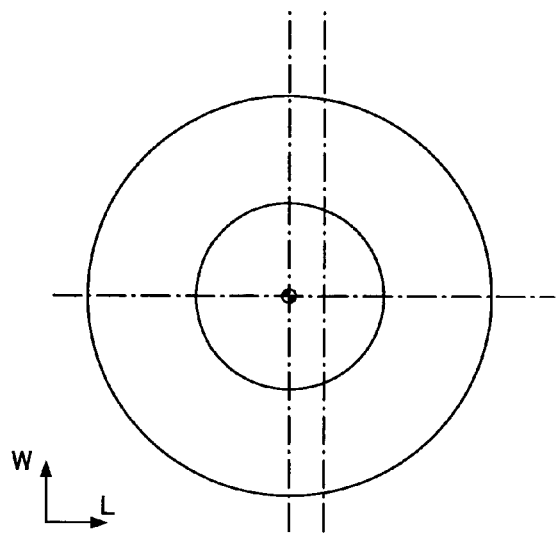
FIGS. 3A-3C are three mutually perpendicular views of a strut type suspension according to a second embodiment of the present invention.
Figure 3B:
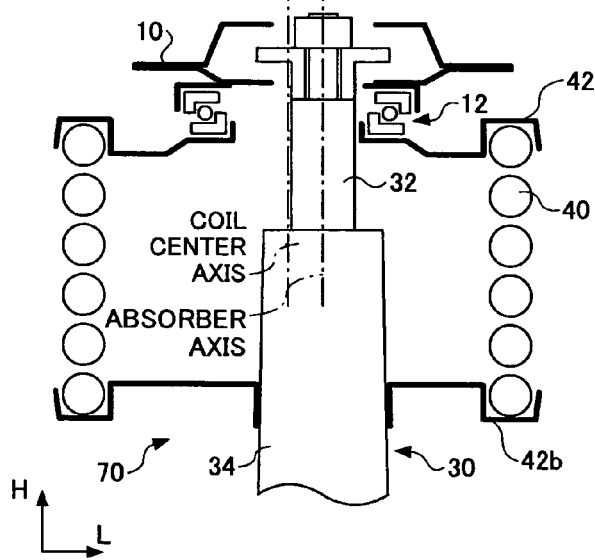
Figure 3C:
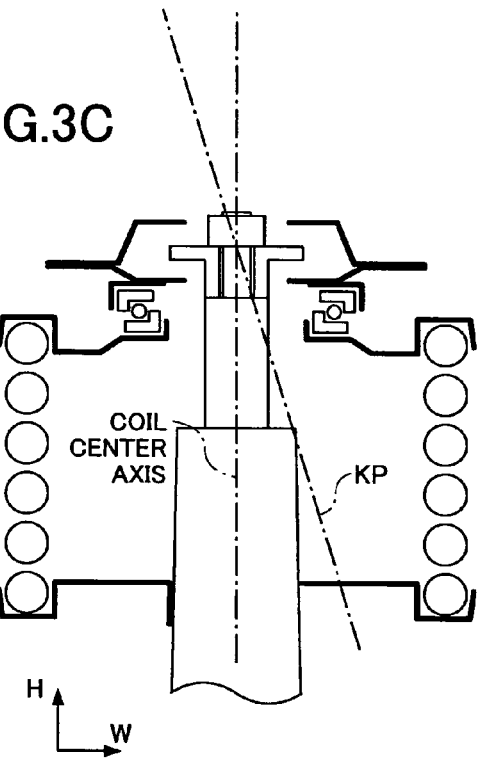

Next, a strut type suspension according to a second embodiment of the present invention is described with reference to FIGS. 3A-3C. FIG. 3 shows the strut type suspension according to the second embodiment in the three mutually perpendicular views as is the case in FIGS. 1A-1C. Specifically, FIG. 3A is a schematic plan view of the strut type suspension seen from above along an axis of a strut, FIG. 3B is a schematic side view of the strut type suspension seen from the inboard side of a vehicle, and FIG. 3C is a schematic rear view of the strut type suspension seen from the back side of the vehicle.

As is the case with the first embodiment, the strut assembly 70 of this embodiment is constructed to be laterally symmetric for use with a left wheel and a right wheel of the vehicle. However, the coil spring 40 may be the same for use in both of the left and right wheels (i.e., the coil spring 40 may have the same winding directions for use in both of the left and right wheels) in order to implement cost reduction due to its shared use.

Next, features of the second embodiment are described. The coil center axis corresponds to the rotating axis of the upper spring seat 42a (the rotating center of the bearing 12 that does not correspond to the absorber axis), as shown in FIGS. 3A and 3B. It is noted that the coil center axis of the coil spring 40 is set substantially parallel to the absorber axis, and is set in the front side of the vehicle with respect to the absorber axis in the side view (see FIG. 3B). Further, in the side view (see FIG. 3B), the absorber axis (=the rotating axis of the bearing 12) is substantially aligned with a kingpin axis, as is the ordinal case. The kingpin axis inclines such that its upper part falls to an inboard side of the vehicle in the rear view (see FIG. 3C), as is the ordinal case.

As is the case with the first embodiment, in this embodiment, the kingpin axis KP and the coil center axis form a twisted relationship that generates moment around the kingpin axis KP in a toe-in direction. However, in this embodiment, since the coil center axis and the rotating axis of the upper spring seat 42a correspond to each other, the coil center axis never changes even when the upper spring seat 42a rotates with the contraction of the coil spring 40 as a result of a suspension stroke during a bound operation. Thus, according to the present embodiment, the twisted relationship between the kingpin axis KP and the coil center axis remains the same during the suspension stroke, and thus the moment-arm length doesn't change. Accordingly, with the present embodiment, as is the case with the first embodiment, since there is no difference in moment generated around the kingpin KP between the left and right suspensions, it is possible to prevent vehicle pull during the stroke operations of the left and right suspensions in phase.

The present invention is disclosed with reference to the preferred embodiment. However, it should be understood that the present invention is not limited to the above-described embodiment, and variations and modifications may be made without departing from the scope of the present invention.

For example, in the above-mentioned embodiment the twisted relationship between the kingpin axis KP and the coil center axis is set so as generate moment around the kingpin axis in a toe-in direction; however, it is possible to set such a twisted relationship that generates moment around the kingpin axis KP in a toe-out direction in order to enhance understeer characteristic in a roll steer.

The invention claimed is:

1. A strut suspension comprising:
   a strut that has an upper end mounted on a vehicle body;
   an upper spring seat rotatably mounted on the strut;
   a lower spring seat fixed to the strut; and
   a coil spring that is provided between the upper spring seat and the lower spring seat while surrounding the strut; wherein
   a coil center axis of the coil spring and a kingpin axis are in a twisted relationship, and
   a rotating center axis of the upper spring seat is aligned with the center axis of the coil spring, and the coil center axis of the coil spring is set substantially parallel to an axis of the strut.

2. A strut suspension comprising:
   a strut that has an upper end mounted on a vehicle body;
   an upper spring seat rotatably mounted on the strut;
   a lower spring seat fixed to the strut; and
   a coil spring that is provided between the upper spring seat and the lower spring seat while surrounding the strut; wherein a coil center axis of the coil spring and a kingpin axis are in a twisted relationship, and a rotating center axis of the upper spring seat is not aligned with the coil center axis of the coil spring, and in a plan view seen from an upper side along an axis of the strut, a lower axis center of the coil spring is located in a front side of the vehicle with respect to the axis of the strut, and, in said view, a line connecting an upper axis center of the coil spring and the axis of the strut extends in an outboard direction of the vehicle with a rotating angle between 40 degrees and 50 degrees around the axis of the strut with respect to a line connecting the lower axis center of the coil spring and the axis of the strut.

3. The strut suspension as claimed in claim 2 configured to be laterally symmetric for use in a left wheel and a right wheel of the vehicle, wherein a winding direction of the coil spring for the left wheel is the same as a winding direction of the coil spring for the right wheel.

4. The strut suspension as claimed in claim 2, wherein the coil center axis of the coil spring and the kingpin axis are in the twisted relationship that generates moment around the kingpin axis in a toe-in direction.

5. The strut suspension as claimed in claim 2, wherein in a plan view seen from an upper side along an axis of the strut, a line connecting a lower axis center of the coil spring and the axis of the strut substantially corresponds to a fore-and-aft direction of the vehicle.

* * * * *